(12) United States Patent
Ruscio et al.

(10) Patent No.: US 7,761,739 B2
(45) Date of Patent: Jul. 20, 2010

(54) METHOD FOR CHECKPOINTING A SYSTEM ALREADY ENGAGED IN A CONCURRENT CHECKPOINT

(75) Inventors: Joseph F. Ruscio, Blacksburg, VA (US); Michael A. Heffner, Blacksburg, VA (US)

(73) Assignee: Librato, Inc., Santa Clara, CA (US)

( * ) Notice: Subject to any disclaimer, the term of this patent is extended or adjusted under 35 U.S.C. 154(b) by 750 days.

(21) Appl. No.: 11/562,591

(22) Filed: Nov. 22, 2006

(65) Prior Publication Data

US 2007/0220356 A1    Sep. 20, 2007

Related U.S. Application Data

(60) Provisional application No. 60/776,179, filed on Feb. 23, 2006.

(51) Int. Cl.
    *G06F 11/00* (2006.01)
(52) U.S. Cl. ....................................................... 714/15
(58) Field of Classification Search ..................... 714/5, 714/15, 42; 711/145, 152, 161, 162
    See application file for complete search history.

(56) References Cited

U.S. PATENT DOCUMENTS

| 5,828,821 | A  | * | 10/1998 | Hoshina et al. ............... 714/15 |
| 6,766,428 | B2 | * | 7/2004  | Saulsbury et al. ............ 711/154 |
| 6,799,189 | B2 | * | 9/2004  | Huxoll ........................ 707/204 |
| 6,959,313 | B2 | * | 10/2005 | Kapoor et al. ............... 707/205 |
| 7,020,599 | B1 | * | 3/2006  | Cao et al. ..................... 703/22 |
| 7,127,577 | B2 | * | 10/2006 | Koning et al. ............... 711/162 |
| 7,174,352 | B2 | * | 2/2007  | Kleiman et al. ............. 707/203 |
| 7,188,273 | B2 | * | 3/2007  | Allen et al. ..................... 714/6 |
| 7,257,606 | B2 | * | 8/2007  | Kapoor et al. ............... 707/205 |
| 7,290,115 | B2 | * | 10/2007 | Hill et al. ..................... 711/207 |
| 7,293,200 | B2 | * | 11/2007 | Neary et al. ................... 714/35 |
| 7,305,582 | B1 | * | 12/2007 | Moser et al. .................. 714/13 |
| 7,308,607 | B2 | * | 12/2007 | Reinhardt et al. ............. 714/25 |
| 7,447,710 | B2 | * | 11/2008 | Sampath et al. ............. 707/202 |
| 2002/0133735 | A1 | * | 9/2002  | McKean et al. ................. 714/5 |
| 2003/0221083 | A1 | * | 11/2003 | Hill et al. ..................... 711/207 |
| 2004/0153615 | A1 | * | 8/2004  | Koning et al. ............... 711/162 |
| 2005/0015663 | A1 | * | 1/2005  | Armangau et al. ............ 714/15 |
| 2005/0050304 | A1 | * | 3/2005  | Mukherjee et al. .......... 712/218 |
| 2005/0144519 | A1 | * | 6/2005  | Hill et al. ..................... 714/13 |
| 2006/0085679 | A1 | * | 4/2006  | Neary et al. .................. 714/13 |
| 2006/0150010 | A1 | * | 7/2006  | Stiffler et al. ................. 714/13 |
| 2007/0005664 | A1 | * | 1/2007  | Kodavalla et al. ............ 707/202 |
| 2007/0055837 | A1 | * | 3/2007  | Rajagopal et al. ........... 711/163 |

* cited by examiner

*Primary Examiner*—Robert Beausoliel
*Assistant Examiner*—Elmira Mehrmanesh
(74) *Attorney, Agent, or Firm*—Arent Fox LLP

(57) ABSTRACT

Concurrent checkpointing for rollback recovery for system failures is disclosed. The system includes a stable database, and a processor configured to receive and process a checkpoint request while a first thread performs a process and a second thread stores contents of memory regions listed in a first list to the stable storage. Processing the checkpoint request includes write protecting all memory regions listed in a previously initialized and populated second list, initializing an empty third list, creating a coalesced list by combining the contents of the first and second lists, and assigning the coalesced list to the second thread while the first thread proceeds with the process.

21 Claims, 7 Drawing Sheets

METHOD FOR CHECKPOINTING A SYSTEM ALREADY ENGAGED IN A CONCURRENT CHECKPOINT

CROSS REFERENCE TO RELATED APPLICATIONS

This application is related to and claims the benefit of the filing date of U.S. provisional application Ser. No. 60/776,179, filed on Feb. 23, 2006, entitled "A Method for Checkpointing a System Already Engaged in a Concurrent Checkpoint," which is hereby incorporated by reference.

BACKGROUND

1. Field

The present disclosure relates generally to distributed processing systems, and more particularly to systems and techniques for recovering from system failures.

2. Background

Computers and other modern processing systems have revolutionized the electronics industry by enabling complex tasks to be performed with just a few strokes of a keypad. These processing systems have evolved from simple self-contained computing devices, such as the calculator, to highly sophisticated distributed processing systems. Today, almost every aspect of our daily lives involves, in some way, distributed processing systems. In its simplest form, a distributed processing system may be thought of an individual desktop computer capable of supporting two or more simultaneous processes, or a single process with multiple threads. On a larger scale, a distributed processing system may comprise a network with a mainframe that allows hundreds, or even thousands, of individual desktop computers to share software applications. Distributed processing systems are also being used today to replace traditional supercomputers, with any number of computers, servers, processors or other components being connected together to perform specialized applications that require immense amounts of computations. The Internet is another example of a distributed processing system with a host of Internet servers providing the World Wide Web.

As we become more dependent upon distributed processing systems in our daily lives, it becomes increasingly important to guard against system failures. A system failure can be at the very least annoying, but in other circumstances could lead to catastrophic results. For the individual desktop computer, a system failure can result in the loss of work product and the inconvenience of having to reboot the computer. In larger systems, system failures can be devastating to the business operations of a company or the personal affairs of a consumer.

A number of system recovery techniques are employed today to minimize the impact of system failures. One such technique involves "checkpointing" and "rollback recovery." During normal operation, each of a computer's processes saves a snapshot of its states, called a "checkpoint," to stable storage. When a failure occurs, a rollback recovery mechanism retrieves a set of saved checkpoints. The failed process can then roll back to the corresponding retrieved checkpoint and resume execution from there. Although this type of automatic recovery is much faster than waiting for a process failure to be manually resolved, computation speed is nevertheless hindered since computation is blocked while checkpoints are saved to stable storage and during process rollbacks.

Computation speed can be even more negatively impacted in distributed systems. In a distributed system, processes communicate by message passing, such that individual process states may become dependent on one another. Determining the state of a distributed system, then, can be complicated. Rollback recovery in a distributed system requires checkpointing a consistent global state, which is a set of process states in which the processes agree on whether or not message exchange among processes has occurred. Thus, each process must make its checkpoints in coordination with other processes. This, of course, increases the amount of time required to store checkpoints. Since access speed to most types of stable storage is orders of magnitude slower than computation, checkpointing consistent global states in a distributed system can have a significant negative effect on computation speed.

One technique for mitigating the slowdown is known as "concurrent checkpointing." This technique involves using memory protection so that computation is allowed to proceed while a checkpoint is stored to stable storage. Concurrently storing checkpoints in the background can prevent computation from being blocked for long periods in certain types of distributed computing systems. This technique can be useful in systems that take checkpoints infrequently, for example on the order of every 15 minutes or more. Unfortunately, many systems require taking small checkpoints very frequently, such as on the order of hundreds of milliseconds. For example, enterprise systems involving financial transactions and other rapidly changing data sets must be frequently checkpointed since the transactions themselves cannot be repeated in order to re-start a system during a rollback. In this type of system, concurrent checkpointing has not been as beneficial because a second checkpoint is often requested while a first checkpoint is still being stored. This means that the process is blocked until the first checkpoint has finished storing and computation cannot proceed. In the case of rapid checkpointing, a process can be repeatedly blocked this way, such that performance is significantly diminished. Thus, while concurrent checkpointing has helped computation time in some distributed systems, it has not resolved the problem of computation blocking in many important types of distributed systems.

SUMMARY

In one aspect of the present disclosure, a storage medium contains a set of program instructions executable by a processor within a system. The set of program instructions includes a routine to receive a checkpoint request while a first thread performs the process and a second thread stores contents of memory regions listed in a first list to stable storage, a routine to write protect all memory regions listed in a previously initialized and populated second list, a routine to initialize an empty third list, a routine to create a coalesced list by combining the contents of the first and second lists, and a routine to assign the coalesced list to the second thread while the first thread proceeds with the process.

In another aspect of the present disclosure, a storage medium contains a set of program instructions executable by a processor within a system. The set of program instructions includes a routine to receive a checkpoint request while a first thread performs the process and a second thread stores contents of memory regions listed in a first list to stable storage, a routine to determine that the size of the first list is less than a tolerance value, a routine to write protecting all memory regions listed in a previously initialized and populated second list, and initialize an empty third list, in response to the determination, a routine to create a coalesced list by combining the contents of the first and second lists, and assign the coalesced list to the second thread while the first thread proceeds with the process, and a routine to increment the size of the first list.

In yet another aspect of the present disclosure, a storage medium contains a set of program instructions executable by a processor within a system. The set of program instructions includes a routine to receive a checkpoint request while a first thread performs the process and a second thread stores contents of memory regions listed in a first list to stable storage, a routine to determine that the size of the first list exceeds a tolerance value, and a routine to block processing by the first thread in response to the determination.

In still another aspect of the present disclosure, a computer system includes a processor and a communications output communicatively connected to stable storage. The processor is configured to receive a checkpoint request while a first thread performs a process and a second thread stores contents of memory regions listed in a first list to the stable storage. The processor further configured to write protect all memory regions listed in a previously initialized and populated second list and to initialize an empty third list. The processor is further configured to create a coalesced list by combining the contents of the first and second lists. The processor is further configured to assign the coalesced list to the second thread while the first thread proceeds with the process.

In another aspect of the present disclosure, a computer system includes a processor and a communications output communicatively connected to stable storage. The processor is configured to receive a checkpoint request while a first thread performs the process and a second thread stores contents of memory regions listed in a first list to the stable storage. The processor is further configured to determine that the size of the first list is less than a tolerance value and, in response to the determination, write protect all memory regions listed in a previously initialized and populated second list and initialize an empty third list. The processor is further configured to create a coalesced list by combining the contents of the first and second lists, and assign the coalesced list to the second thread while the first thread proceeds with the process. The processor is further configured to increment the size of the first list.

In yet a further aspect of the present disclosure, a computer system includes a processor and a communications output communicatively connected to stable storage. The processor is configured to receive a checkpoint request while a first thread performs the process and a second thread stores contents of memory regions listed in a first list to the stable storage. The processor is further configured to determine that the size of the first list exceeds a tolerance value and, in response to the determination, block processing by the first thread.

In another aspect of the present disclosure, a method of checkpointing a system performing a process while engaged in a checkpoint procedure includes receiving a checkpoint request while a first thread performs a process and a second thread stores contents of memory regions listed in a first list to stable storage and, in response to the receipt, write protect all memory regions listed in a previously initialized and populated second list. The method further includes initializing an empty third list, and creating a coalesced list by combining the contents of the first and second lists, and assign the coalesced list to the second thread while the first thread proceeds with the process.

In another aspect of the present disclosure, a processor includes means for receiving a checkpoint request while a first thread performs the process and a second thread stores contents of memory regions listed in a first list to stable storage, means for write protecting all memory regions listed in a previously initialized and populated second list, means for initializing an empty third list, means for creating a coalesced list by combining the contents of the first and second lists, and means for assigning the coalesced list to the second thread while the first thread proceeds with the process.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a communications system are illustrated by way of example, and not by way of limitation, in the accompanying drawing, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
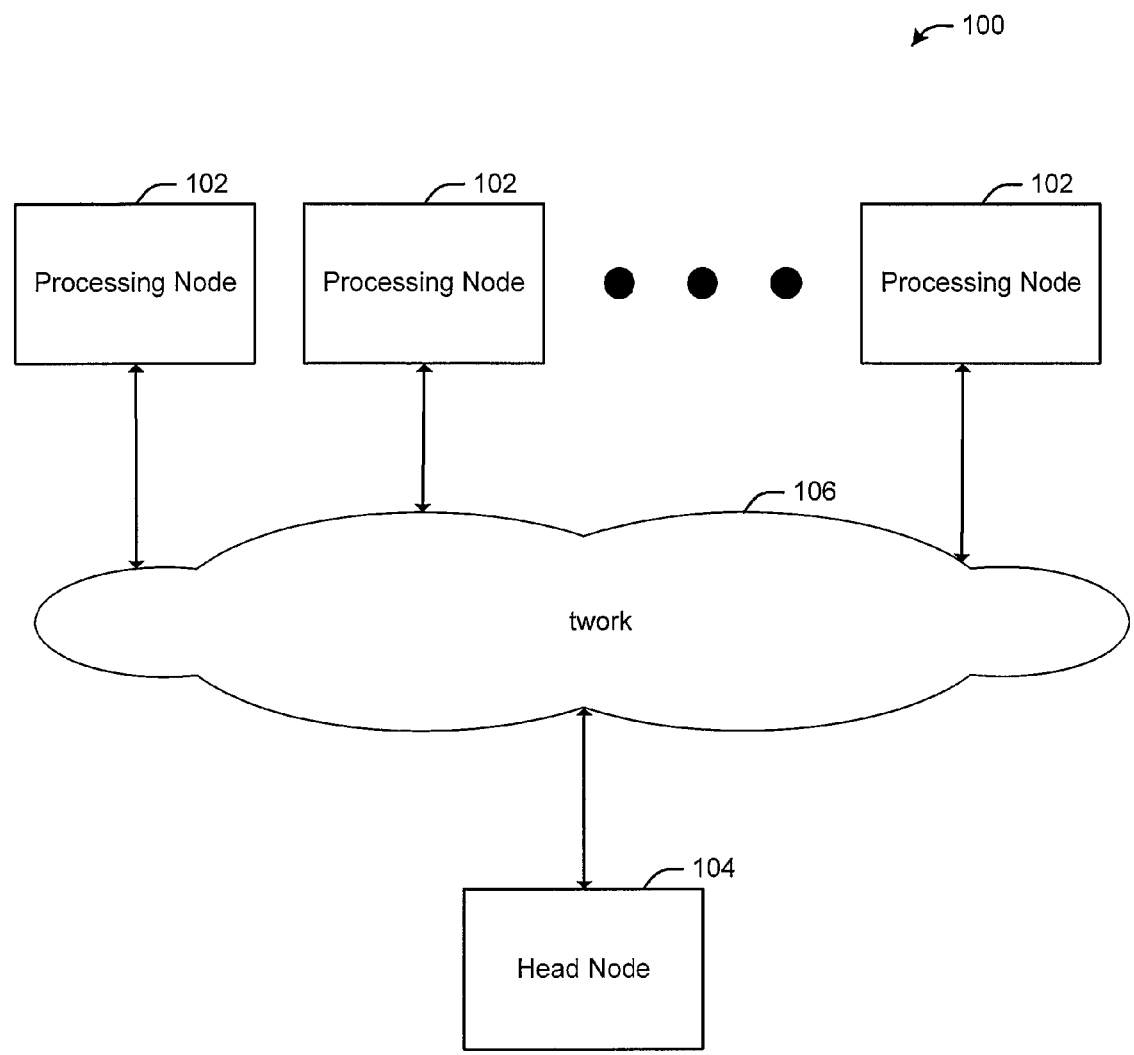
FIG. 1 is a conceptual block diagram illustrating an example of a distributed processing system.

The various techniques described throughout this disclosure may be applied to the constituent components of a distributed processing system to recover from a system failure when checkpoints are requested while earlier checkpoints are still being taken, i.e. pending. The distributed processing system of FIG. 1 will be used to illustrate this concept. A distributed processing system 100 may include a group of processing nodes 102 connected to a head node 104 through a network 106. Each processing node 102 may be a computer system having a communications output for being communicatively connected to other computer systems or external storage devices. The network 106 may be a packet-base network, such as the Internet or corporate Intranet, or any other type of suitable network. The group of processing nodes 102 may be any combination of desktop computers, laptop computers, client workstations or terminals, or other processing nodes. These processing nodes 102 may be connected to the network 106 in any suitable fashion including Ethernet, T1, wireless, cable modem, DSL, fiber optic, or the like. The head node 104 may be a server-enabled computer, a dedicated server, a mainframe, or other node providing resources to the processing nodes 102.

The individual nodes, including the processing nodes 102 and the head node 104, are constituent components of the distributed processing system 100. A globally consistent state can be reestablished after system failure if checkpoints are taken just prior to communications between the nodes and the rest of the distributed processing system 100. Taking a checkpoint involves recording the state of a software process performing a computation to some form of persistent storage. In a distributed system, a global state may be recorded by taking a checkpoint for each node. An example will now described with reference to the head node 104 as the constituent component, however, those skilled in the art will readily understand how to apply these concepts that to any processing node 102, or any other component of a distributed processing system.

Figure 2:
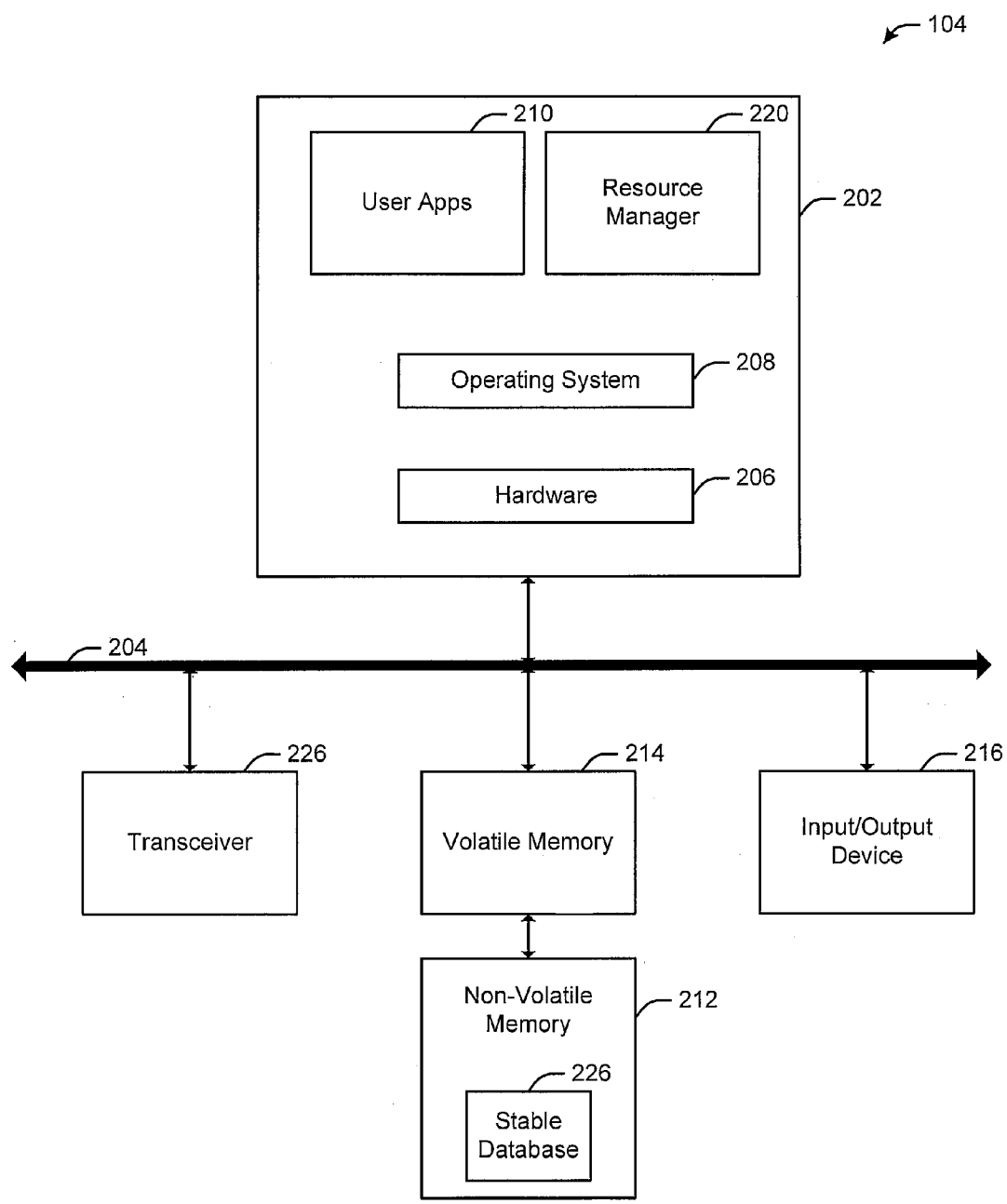
FIG. 2 is a conceptual block diagram illustrating an example of the functionality of a server with a single processor.

FIG. 2 is a conceptual block diagram of a head node implemented as a server on the network. The server 104 may include at least one processor 202 connected to any number of peripheral devices through a high speed system bus 204. The processor 202 may be implemented in hardware, software, firmware, or any combination thereof. Typically, the processor 202 will include hardware 206 that supports an operating system 208 or other application execution environment. The operating system 208 may include a software program that manages all other software programs in the processor 202. These other software programs are generally referred to as applications.

The operating system 208 and applications may be stored in non-volatile memory 212 such as a magnetic hard drive, an optical disk, a disk array, CD ROM, tape backup, reel-to-reel, and/or any other inexpensive permanent memory capable of storing large amounts of data and software programs. The operating system 208 may initially be loaded from the non-volatile memory 212 into a high speed volatile memory 214 attached to the system bus 204. This allows the processor 202 to have immediate access to the operating system 208 to improve overall system performance. The volatile memory 214 may be implemented in RAM, DRAM, SDRAM, or any other suitable high speed storage medium. An input/output device 216 may be used to provide an interface between the system bus 204 and the non-volatile memory 212.

The processor 202 may also retrieve other applications and files from non-volatile memory 212. These applications and files may also be loaded into the volatile memory 214 for quick access by the processor 202. Typically, user applications 210 are run by the processor 202, the files updated in the volatile memory 214, and the application and the updated files written back out to non-volatile memory 212 when the processor 202 is done.

In one embodiment of the server 104, the processor 202 may invoke an application called "resource manager." The resource manager 220 may be responsible for inducing a checkpoint to record the current state of the applications running on the processor 202 to a stable database 224 in the non-volatile memory 212. Once the checkpoint is taken, a message from the processor 202 can be sent over the network through a transceiver 226.

Figure 3:
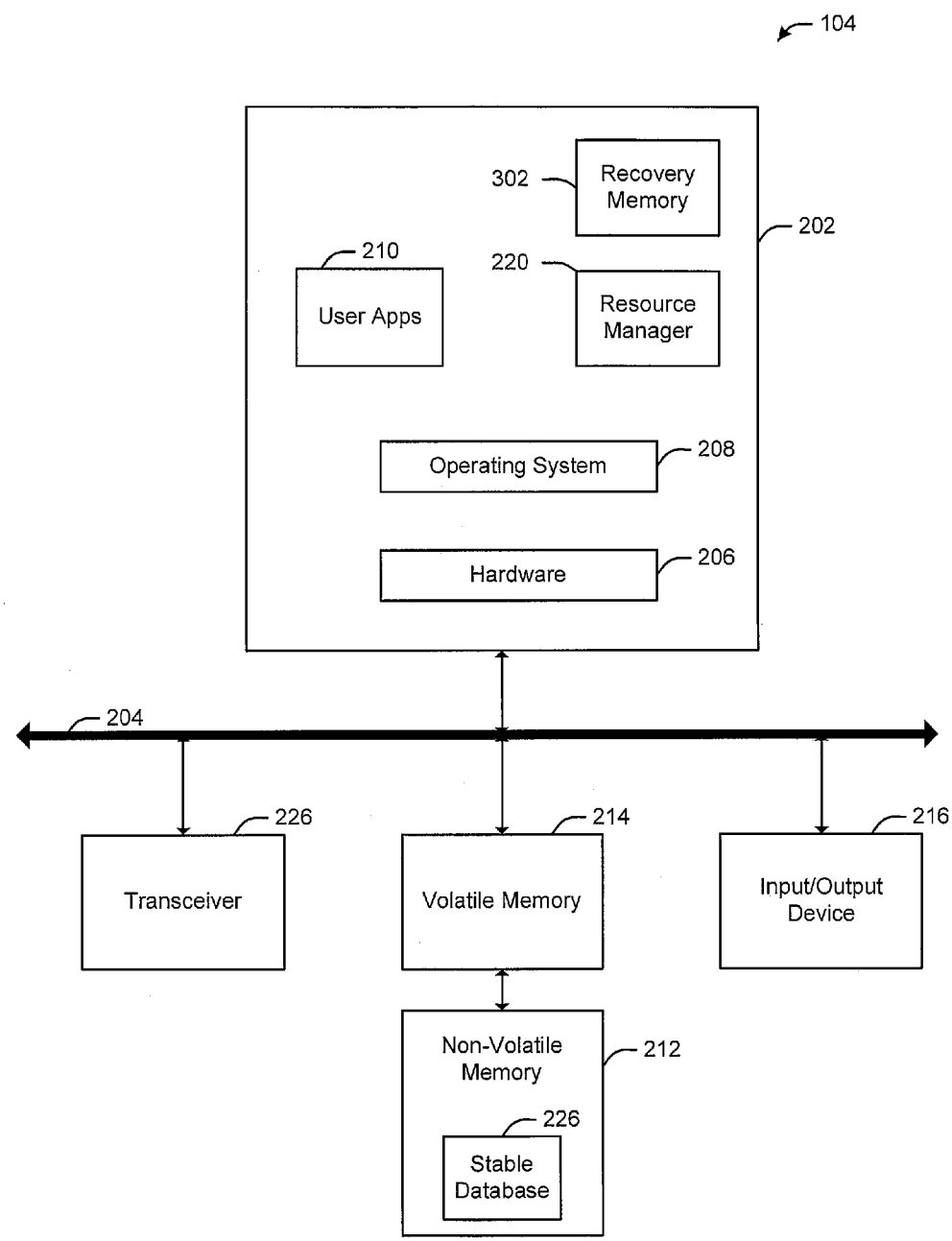
FIG. 3 is a conceptual block diagram illustrating an example of the functionality of a server with a single processor capable of invoking a recovery manager.

When a system fault occurs, the processor 202 may invoke a "recovery manager" as shown in FIG. 3. The recovery manager 302 is also an application that can be loaded from the non-volatile memory 212 into the volatile memory 214 and executed by the processor 202. The recovery manager 302 may be used to induce recovery from the stable database 224 the state of each application running on the processor 202 when the last checkpoint was taken. Alternatively, this function may be accomplished by the resource manager 220 or some other component. This information may then be used by the recovery manager 302 to roll back the processor 202 to a state that existed prior to the system failure.

Returning to FIG. 2, the head node may be configured, by way of example, as a server capable of supporting e-commerce transactions with multiple processing nodes. In this example, the server 104 may receive a request over the network from two different processing nodes, or computers, attempting to purchase the same item. The two requests may be received at the transceiver 226 and provided to the processor 202 where they may then be processed in parallel by separate threads of an application. Each thread may attempt to access the volatile memory 214 to retrieve a state variable j relating to the item. In this example, $j=1$ if the item is still available, and $j=0$ if the item has been sold. The operating system 208 may use a scheduling algorithm to determine the order in which the two threads will have access to the state variable j. The first thread granted access by the operating system 208 may load the state variable j into a processor register (not shown), confirm that the item is still available (i.e., $j=1$), complete the transaction, and decrement the state variable j (i.e., set $j=0$) before writing it back to the volatile memory 214. Once the transaction is complete, the resource manager 220 may induce a checkpoint, which is taken by recording the current state of the user applications 210 to the stable database 224 in the non-volatile memory 212. The state of the first thread may include the state variable $j=1$. The server 104 may then send a confirmation over the network to the computer requesting the transaction.

Next, the operating system 208 may grant a second thread access to the state variable j in the volatile memory 214. The second thread may process the state variable in the same way, but this time it will not be able to consummate the transaction because the item is no longer available (i.e., the state variable $j=0$). In this case, the server 104 may send a message over the network back to the requesting computer indicating that the item is unavailable.

Should a system fault occur while the second thread is processing the request, the processor 202 may invoke the recovery manager 302 as shown in FIG. 3. The recovery manager 302 may recover from the stable database 224 the state of the user applications 210 running on the processor 202 when the last checkpoint was taken. In this case, the recovery manager 302 rolls back the processor 202 to the state that existed just prior to the server 104 sending the confirmation over the network to the computer requesting the item. Once the processor 202 is rolled back to this state, the confirmation may be re-sent by the server 104, and the second thread may begin processing its request to purchase the item by loading the state variable j from the volatile memory 214 to a processor register (not shown). Since the state variable j recovered from the non-volatile memory 212 is zero, the request to purchase the item will be denied, thereby resulting in a globally consistent state (i.e., the server 106 did not sell the item to both consumers).

A globally consistent state can be achieved even if the system fails while the first thread is processing the request. Under this scenario, the processor 202 may be rolled back to a state that existed prior to the system failure. Assuming that last checkpoint was taken prior to scheduling the threads, it is possible that the second thread will be granted access to the state variable j before the first thread. If this occurs, then the item will be sold to the consumer whose request is being processed by the second thread. Although this result is different than the one that would have occurred had the system not failed, it is still a globally consistent state because the item is sold to only one consumer. The consumer whose request was being processed by the first thread does not receive an inconsistent message because the system failed before he or she received a confirmation from the server 104.

Because financial transactions like the ones described above involve personal information sent across the network by consumers, a system may be configured to take numerous and very frequent checkpoints. Doing so reduces the possibility of having to request a consumer's personal information again in the event that the system fails during a transaction. However, increasing the number and frequency of checkpoint requests also increases the probability that a checkpoint may be requested while another checkpoint is still pending. Therefore, a system designed in accordance with the teachings herein can achieve a globally consistent state even if a checkpoint request arrives while an earlier checkpoint procedure is already pending.

Figure 4:
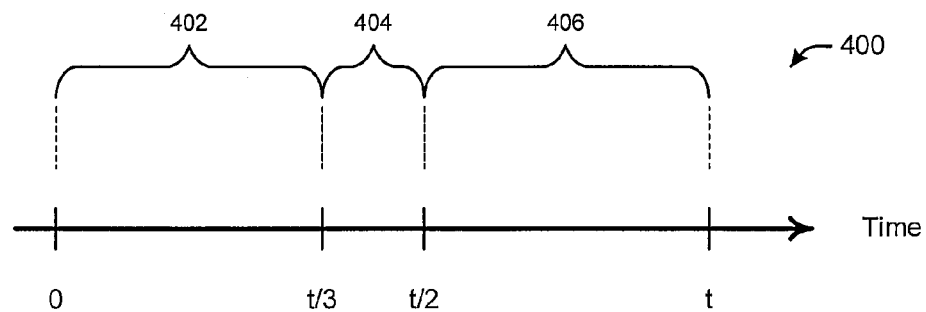
FIG. 4 is a timeline according to which a checkpoint request arrives while a checkpoint procedure is already pending.

FIG. 4 illustrates a timeline 400 according to which such a scenario may proceed. In the interval 402, between time 0 and time t/3, a computation may be operating under the direction of a user application or process. The process may access memory in order to store values, perform calculations, replace values and the like. By keeping track of the process' access to memory, information can be preserved for the purpose of rolling an application back to a globally consistent state in the event of a system failure. In order to track this information, the memory can be write-protected. Write protection causes a notification to be sent every time a process attempts to access the memory. Memory regions, such as pages, that are accessed because a process needs to write to them may then be recorded in a file, array or other suitable form. As used herein, the term "commit list" refers to such a list of memory regions that a process attempts to write to. It is not limited to any particular type of file or data structure, but may take any form suitable for storing data. The commit list may be populated with pages to which a process requests write access during interval 402, as the process runs on the computation thread. This procedure will be explained in further detail below with reference to FIG. 5. It is to be understood that a commit list is not limited to storing memory region information on a "page" level, and that other sizes of memory regions may also be recorded and managed in a commit list.

At time t/3, a checkpoint request may be received. Taking a checkpoint may involve recording the state of a process in non-volatile memory, so that it is available for use in a rollback in the event of a system failure. The checkpoint procedure may proceed in parallel with the continuing process on the computing thread, in interval 404. This will be explained in further detail below with reference to FIG. 6.

The checkpoint procedure may not be completed until time t, as will be explained below with reference to FIG. 7. However, at time t/2, a second checkpoint request may be received. Thus, the interval 406 represents a time during which the process is running on the computing thread, an earlier checkpoint procedure (the "concurrent" checkpoint) is still pending, and a second checkpoint has been requested. This second checkpoint request may be handled in parallel with the concurrent checkpoint that was requested at time t/3. A method of checkpointing a system performing a process and already engaged in a concurrent checkpoint procedure will be explained in further detail below with reference to FIGS. 8 and 9.

Figure 5:
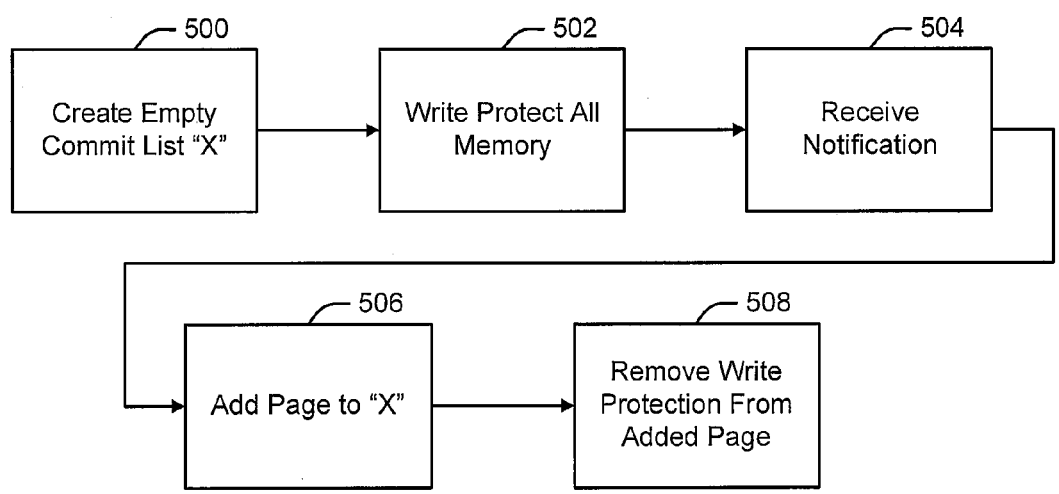
FIG. 5 is a conceptual block diagram illustrating an example of the functionality of a processor configured to track memory access by a user application.

FIG. 5 is a conceptual block diagram illustrating an example of the functionality of a processor configured to track memory write access by a user application or process thereof. At block 500, the processor may create an empty commit list. The commit list may be denoted "X" for simplicity. At block 502, the processor may write protect all memory accessible by the process. When the memory is write protected, a message will be generated each time the process attempts to modify a memory region. These messages can be used to track which memory regions are accessed and modified by the process. Thus, at block 504 when a notification of memory write access is received, then the accessed page may be added to the commit list "X" at block 506. Adding this page to the commit list creates a record that can be relied on during a checkpoint procedure, so that the system can roll back to a known state in the event of a system failure. At this point, since the page has already been recorded in the commit list "X", future modification of this page by the process need not be noted. In other words, the commit list needs only to track which pages have been modified, irrespective of how many times a modification has occurred. Therefore, write protection for this page may be turned off at block 508.

Figure 6:
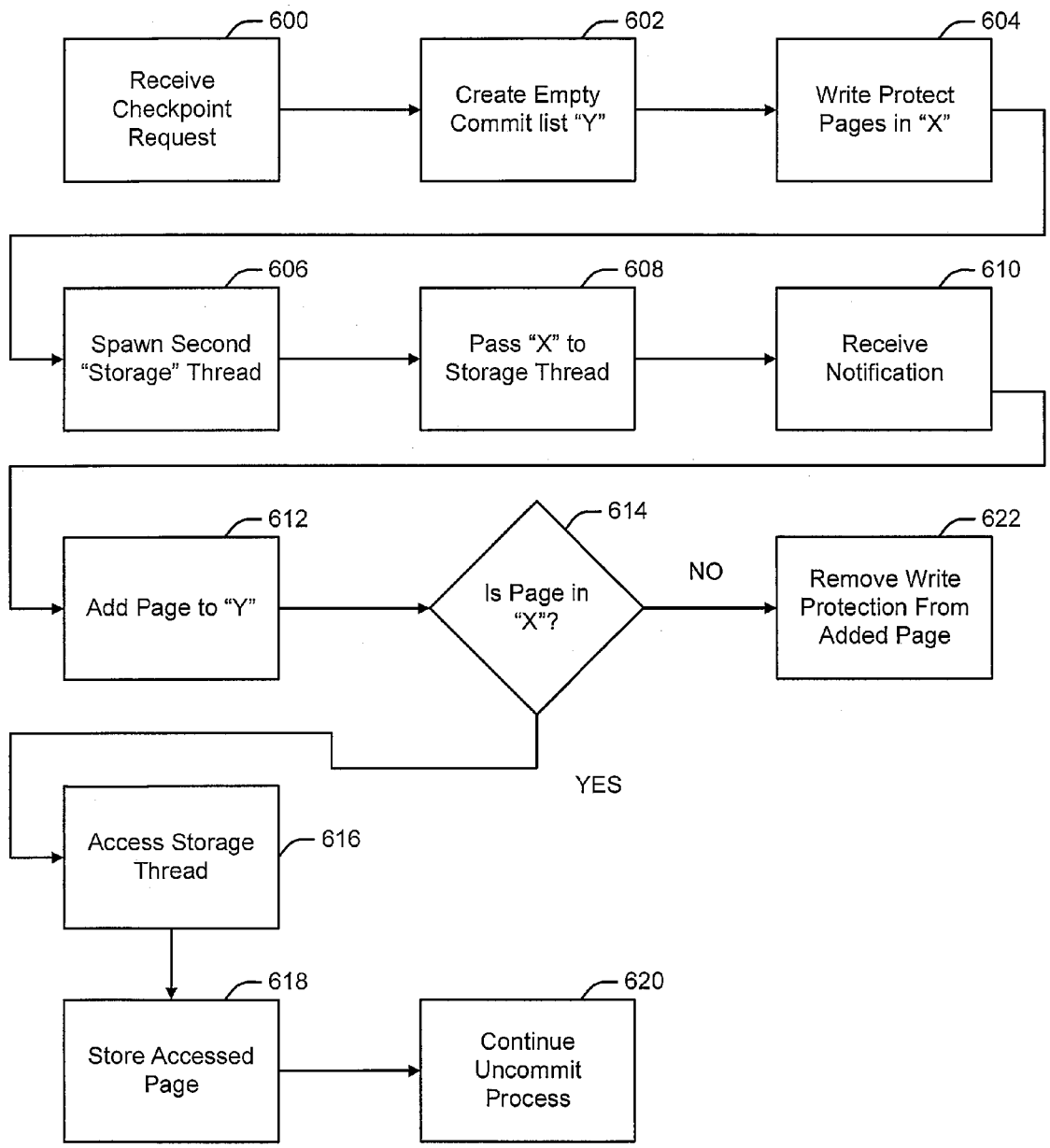
FIG. 6 is a conceptual block diagram illustrating an example of the functionality of a processor configured to perform a checkpoint procedure.

FIG. 6 is a conceptual block diagram illustrating an example of the functionality of a processor configured to perform a checkpoint procedure. At block 600 a checkpoint request may be received. To perform the checkpoint procedure, the processor may first create a second empty commit list at block 602. The commit list may be denoted "Y" for simplicity. At block 604 the pages listed in commit list "X" may have write protection re-enabled. This is because those pages will now be recorded to non-volatile memory as part of this checkpoint procedure, but they must be tracked once again for purposes of any subsequent checkpoint procedures. At block 606 the processor may spawn a second "storage" thread that can perform the checkpoint procedure in parallel with the process that continues to run on the computation thread. The populated commit list "X" may then be passed to the storage thread at block 608. At that point, the storage thread may continue performing the checkpoint procedure by storing information from the commit list "X" into non-volatile memory. Then, if the system fails, that information will be available to use during a rollback procedure. Once a page from a commit list is stored into non-volatile memory, that page can be "uncommitted," or removed from the commit list. Thus, as the checkpoint procedure progresses, the commit list "X" grows continually smaller as each page is uncommitted.

While the storage thread continues with the pending checkpoint procedure, the computation thread may continue to serve the process. Since all the memory is once again write-protected, notifications may be received at block 610 any time the process attempts to write to a memory region. While the checkpoint procedure is running on the storage thread, if a notification arrives at block 610 the affected page may be added to the new commit list "Y" at block 612. Then the processor can determine whether the affected page is also in the previous commit list "X" at decision block 614. If it is, then that page has not yet been stored to non-volatile memory because it has not been uncommitted from "X." Accordingly, the computation thread should not yet modify this page or it will have the wrong value by the time the storage thread attempts to record it as part of the earlier checkpoint request. Thus, the processor may immediately store that page at block 616, and remove its write protection at block 618. The immediate storage of the page at issue, even though it is not "next in line" in the commit list "X," may be accomplished by either the computation thread or the storage thread. In the first case, the computation thread may access the commit list "X" even while the storage thread continues the "uncommit" process on that commit list. Once the page at issue is stored and uncommitted, the computation thread may proceed with its process, and access the now-available page. Alternatively, the storage thread may change the order of commit list "X" by placing a priority on the page at issue, such that it saves and uncommits it from the list ahead of its turn. In either case, once the previous value of that page has been recorded in non-volatile memory, the computation thread can proceed to access the page as directed by the process, and the storage thread may continue with its "uncommit" process at block 620. Of course, if the processor had determined at decision block 614 that the page was not in the commit list "X," the page could immediately be modified by the process and have its write protection removed, at block 622.

Figures 7, 8:
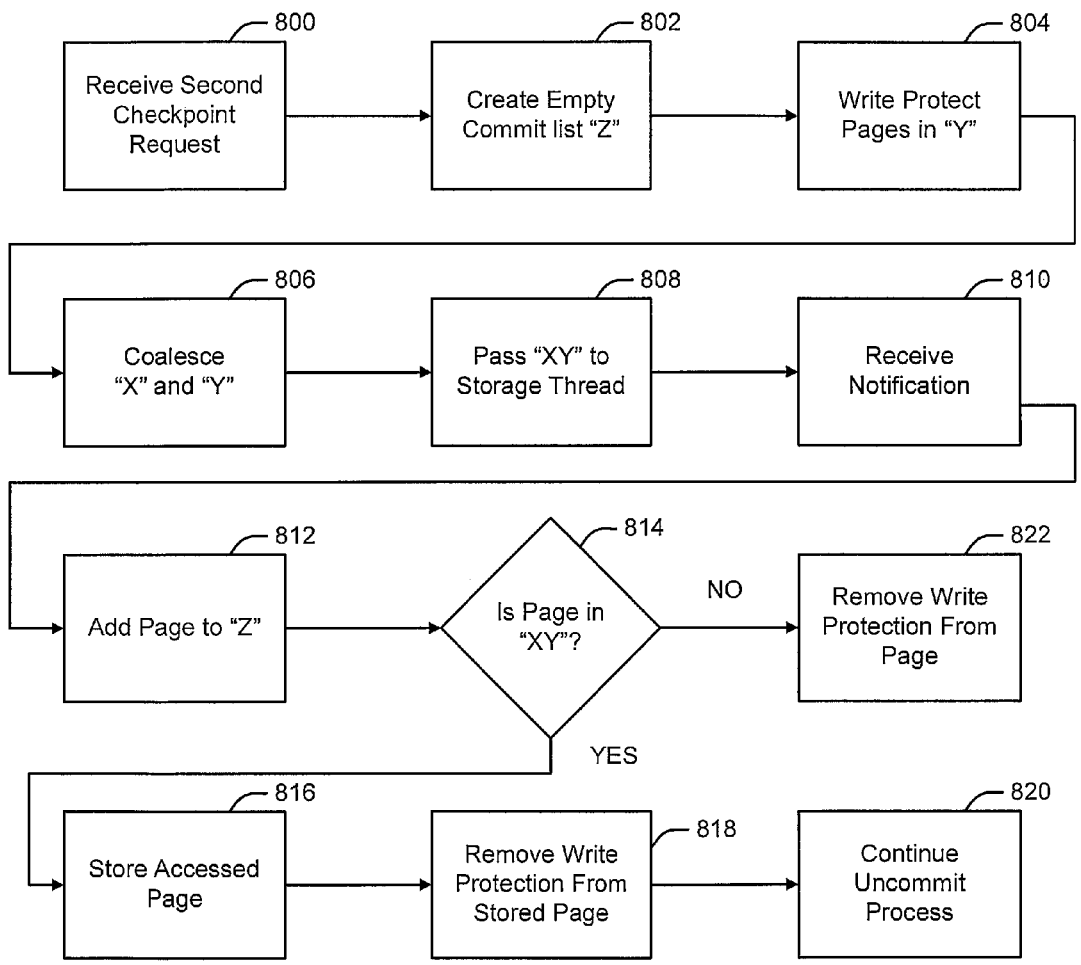
FIG. 7 is a conceptual block diagram illustrating an example of the functionality of a processor configured to complete a checkpoint procedure.
FIG. 8 is a conceptual block diagram illustrating an example of the functionality of a processor configured to perform a checkpoint procedure while a process is running and while a concurrent checkpoint procedure is pending.

FIG. 7 is a conceptual block diagram illustrating an example of the functionality of a processor configured to complete a checkpoint procedure. As explained above, when the storage thread stores the contents of pages listed in a commit list, it uncommits those pages from the list. Eventually, as indicated at block 700, all pages will be uncommitted from the commit list and the commit list will be empty. At that point, the post-checkpoint commit list "Y" can become the new "X" (which is the commit list currently being populated by the computation thread), as indicated at block 702.

FIG. 8 is a conceptual block diagram illustrating an example of the functionality of a processor configured to perform a checkpoint procedure while a process is running and while a concurrent checkpoint procedure is pending. As explained above, the process may be running on the computation thread while a checkpoint procedure is running on a storage thread. At this time, a second checkpoint request may be received as indicated at block 800. To handle this second checkpoint while the first one is still pending, and while the process continues to run, the processor may create a third commit list at block 802. This new, empty commit list may be referred to as "Z" for simplicity. At block 804 the pages in commit list "Y" may be write protected. This will result in notification if the process attempts to modify those pages before they are saved to non-volatile memory and uncommitted by the checkpoint procedure. At block 806, commit list "X" and commit list "Y" may be coalesced to form a new, combined commit list "XY." All of the pages listed in "XY" are write protected, since all of the pages in "X" and all of the pages in "Y" were previously write protected. At block 808, commit list "XY" may be passed to the storage thread to proceed with storage to non-volatile memory.

While this second checkpoint procedure is pending, notification may be received at block 810 that the process needs to access and modify a write protected page. This page may be added to the new commit list "Z" at block 812. Then, the processor may check at decision block 814 whether the page is listed in the coalesced commit list "XY." If it is, then that page has not yet been stored to non-volatile memory because it has not been uncommitted from "XY." Accordingly, the computation thread should not yet modify this page or it will have the wrong value when the storage thread attempts to record it. Thus, the processor may immediately store that page at block 816, and remove its write protection at block 818. The immediate storage of the page at issue, even though it is not "next in line" in the commit list "XY," may be accomplished by either the computation thread or the storage thread. In the first case, the computation thread may access the commit list "XY" even while the storage thread continues the "uncommit" process on that commit list. Once the page at issue is stored and uncommitted, the computation thread may proceed with its process, and access the now-available page. Alternatively, the storage thread may change the order of commit list "XY" by placing a priority on the page at issue, such that it saves and uncommits it from the list ahead of its turn. In either case, once the previous value of that page has been recorded in non-volatile memory, the computation thread can proceed to access the page as directed by the process, and the storage thread may continue with its "uncommit" process at block 820. Of course, if the processor had determined at decision block 814 that the page was not in the coalesced commit list "XY," the page could immediately be accessed by the process and have its write protection removed, at block 822.

As will be appreciated by the above description, the second checkpoint procedure can occur in parallel with both the process and the concurrent checkpoint procedure. By coalescing the previous two commit lists and starting a third commit list, the computation thread can continue, uninterrupted, while pages listed in the coalesced commit lists are stored to non-volatile memory and pages accessed by the computation thread are tracked and listed in the new, third commit list. This process of coalescing the previous commit lists could continue indefinitely to allow the computation to continue uninterrupted. However, doing so may cause the coalesced commit list to continually grow without ever being depleted through the "un-committing" process of the checkpoint procedure. Thus, a tolerance value may be implemented to limit the amount of coalescing that is permitted before the computation thread is interrupted to allow the checkpoints to catch up.

Figure 9:
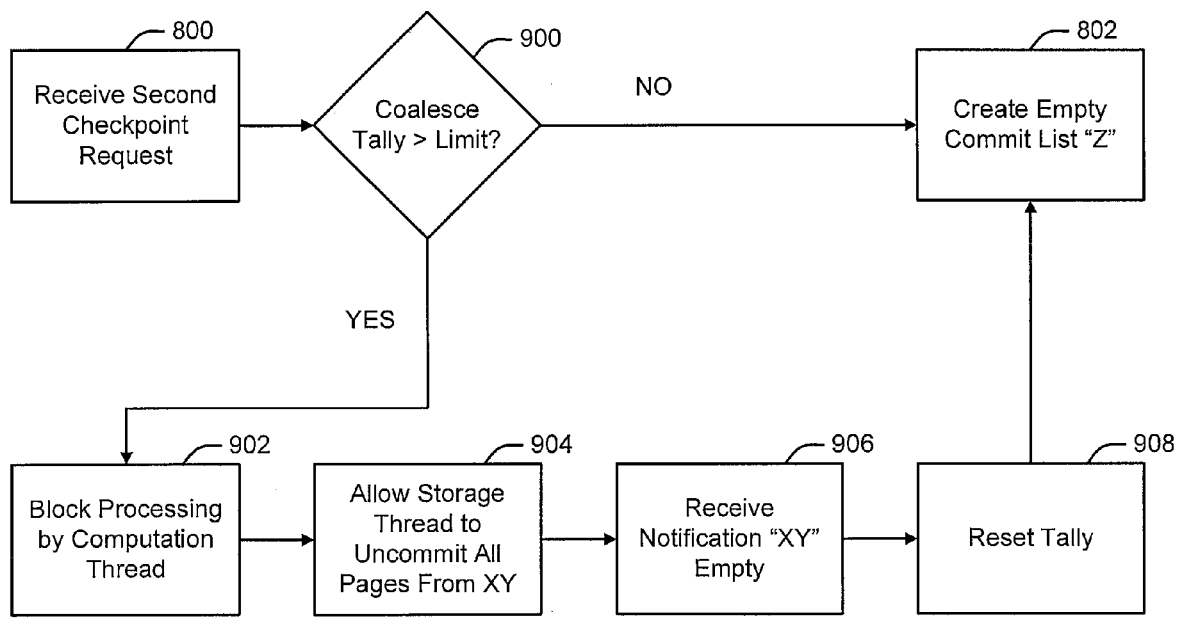
FIG. 9 is a conceptual block diagram illustrating additional details of an example of the functionality of a processor configured to perform a checkpoint procedure while a process is running and while a concurrent checkpoint procedure is pending.

FIG. 9 is a conceptual block diagram illustrating additional details of an example of the functionality of a processor configured to perform a checkpoint procedure while a process is running and while a concurrent checkpoint procedure is pending. These additional details may comprise steps to implement a tolerance value for limiting the amount of coalescing that is permitted in the procedures described above. These steps may be performed between receipt of a second checkpoint request at block 800 in FIG. 8 and creation of the empty commit list "Z" at block 802 in FIG. 8. To implement use of a tolerance value, a tally may be kept of the number of times that commit lists are coalesced. At decision block 900, after a second (or third, or any subsequent) checkpoint is requested, the tally may be compared to a tolerance value and the processor may determine whether the tally exceeds the allowed limit. If it does not, then the checkpoint procedure may continue with the creation of a new empty commit list as indicated at block 802 and as described above. Otherwise, processing may be halted at block 902 to allow the checkpointing procedure to catch up and be completed. While the computation thread is halted, the storage thread may be allowed to record and un-commit all pages listed in the coalesced commit list at block 904. This may be commit list "XY" or a commit list comprising other, multiple previous commit lists. After the storage thread completes this process, the system may receive notification at block 906 that the coalesced commit list is empty. The tally may then be reset, to zero or some other default value, and processing may resume.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A storage medium containing a set of program instructions executable by a processor within a system, comprising:
    a routine to receive a checkpoint request while a first thread performs a process and while a second thread performs a second checkpoint concurrently, the second checkpoint comprising storing contents of memory regions listed in a first list to stable storage;
    a routine to determine that the size of the first list is less than a tolerance value;
    a routine to write protecting all memory regions listed in a previously initialized and populated second list, and initialize an empty third list, in response to the determination;
    a routine to create a coalesced list by combining the contents of the first and second lists, and assign the coalesced list to the second thread while the first thread proceeds with the process; and
    a routine to increment the size of the first list.

2. The storage medium of claim 1 wherein the size of the first list comprises the number of times the first list has been coalesced with other lists.

3. The storage medium of claim 1 further comprising a routine to receive notification that the first thread needs write access to a memory region, add the memory region to the third list, determine that the memory region is not listed in the coalesced list, and remove write protection from the memory region.

4. The storage medium of claim 1 further comprising a routine to receive notification that the first thread needs write access to a memory region, add the memory region to the third list, determine that the memory region is listed in the coalesced list, access the second thread and cause it to record the contents of the memory region to stable storage immediately, and remove write protection from the memory region.

5. A storage medium containing a set of program instructions executable by a processor within a system, comprising:
    a routine to receive a checkpoint request while a first thread performs a process and while a second thread implements a second checkpoint concurrently, the second checkpoint comprising storing contents of memory regions listed in a first list to stable storage; and
    a routine to determine that the size of the first list exceeds a tolerance value; and a routine to block processing by the first thread in response to the determination.

6. The storage medium of claim 5 further comprising:
    a routine to allow the second thread to record in stable storage the contents of all the memory regions listed in the first list while the first thread is blocked; and
    a routine to receive notification that the first list is empty and allowing processing by the first thread to proceed.

7. A computer system, comprising: a communications output communicatively connected to stable storage; and
    a processor configured to receive a checkpoint request while a first thread performs a process and while a second thread implements a second checkpoint concurrently, the second checkpoint comprising storing contents of memory regions listed in a first list to the stable storage;
    the processor further configured to write protect all memory regions listed in a previously initialized and populated second list and to initialize an empty third list;
    the processor further configured to create a coalesced list by combining the contents of the first and second lists; and
    the processor further configured to assign the coalesced list to the second thread while the first thread proceeds with the process.

8. The computer system of claim 7 wherein the processor is further configured to direct the second thread to record the contents of memory regions listed in the coalesced list to the stable storage and remove those memory regions from the coalesced list.

9. The computer system of claim 7 wherein the processor is further configured to receive notification that the first thread needs write access to a memory region and, in response to the notification, add the memory region to the third list, and wherein the processor is further configured to determine that the memory region is not listed in the coalesced list and, in response to the determination, remove write protection from the memory region.

10. The computer system of claim 7 wherein the processor is further configured to receive notification that the first thread needs write access to a memory region and, in response to the notification, add the memory region to the third list, and wherein the processor is further configured to determine that the memory region is listed in the coalesced list and, in response to the determination, record the contents of the memory region to stable storage immediately and remove write protection from the memory region.

11. A computer system, comprising: a communications output communicatively connected to stable storage; and
    a processor configured to receive a checkpoint request while a first thread performs a process and while a second thread implements a second checkpoint concurrently, the second checkpoint comprising storing contents of memory regions listed in a first list to the stable storage;
    the processor further configured to determine that the size of the first list is less than a tolerance value and, in response to the determination, write protect all memory regions listed in a previously initialized and populated second list and initialize an empty third list;
    the processor further configured to create a coalesced list by combining the contents of the first and second lists, and assign the coalesced list to the second thread while the first thread proceeds with the process; and the processor further configured to increment the size of the first list.

12. The computer system of claim 11 wherein the processor is further configured to receive notification that the first thread needs write access to a memory region, add the memory region to the third list, determine that the memory region is not listed in the coalesced list, and remove write protection from the memory region.

13. The computer system of claim 11 wherein the processor is further configured to receive notification that the first thread needs write access to a memory region, add the memory region to the third list, determine that the memory region is listed in the coalesced list, record the contents of the memory region to stable storage immediately, and remove write protection from the memory region.

14. A computer system, comprising:
  a communications output communicatively connected to stable storage; and
  a processor configured to receive a checkpoint request while a first thread performs a process and while a second thread implements a second checkpoint concurrently, the second checkpoint comprising storing contents of memory regions listed in a first list to the stable storage; and
  wherein the processor is further configured to determine that the size of the first list exceeds a tolerance value and, in response to the determination, block processing by the first thread.

15. The computer system of claim 14 wherein the processor is further configured to allow the second thread to record in stable storage the contents of all the memory regions listed in the first list while the first thread is blocked; and
  wherein the processor is further configured to allow processing by the first thread to proceed upon receipt of notification that the first list is empty.

16. A method of checkpointing a system, comprising:
  receiving a checkpoint request while a first thread performs a process and while a second thread implements a second checkpoint concurrently, the second checkpoint comprising storing contents of memory regions listed in a first list to stable storage and, in response to the receipt, write protecting all memory regions listed in a previously initialized and populated second list;
  initializing an empty third list; and
  creating a coalesced list by combining the contents of the first and second lists, and assigning the coalesced list to the second thread while the first thread proceeds with the process.

17. A processor, comprising:
  means for receiving a checkpoint request while a first thread performs a process and while a second thread implements a second checkpoint concurrently, the second checkpoint comprising storing contents of memory regions listed in a first list to stable storage;
  means for write protecting all memory regions listed in a previously initialized and populated second list;
  means for initializing an empty third list;
  means for creating a coalesced list by combining the contents of the first and second lists; and
  means for assigning the coalesced list to the second thread while the first thread proceeds with the process.

18. A storage medium containing a set of program instructions executable by a processor within a system, comprising:
  a routine for receiving a first checkpoint request while a first thread is implementing a process and while a second thread is implementing a second checkpoint concurrently, the second checkpoint comprising storing contents of memory regions listed in a first list to stable storage;
  a routine to write protect all memory regions listed in a previously initialized and populated second list;
  a routine to initialize an empty third list;
  a routine to create a coalesced list by combining the contents of the first and second lists; and
  a routine to assign the coalesced list to the second thread while the first thread proceeds with the process.

19. The storage medium of claim 18 wherein the second thread records the contents of memory regions listed in the coalesced list to stable storage and removes those memory regions from the coalesced list.

20. The storage medium of claim 18 further comprising a routine to receive notification that the first thread needs write access to a memory region, add the memory region to the third list, determine that the memory region is not listed in the coalesced list, and remove write protection from the memory region.

21. The storage medium of claim 18 further comprising a routine to receive notification that the first thread needs write access to a memory region, add the memory region to the third list, determine that the memory region is listed in the coalesced list, record the contents of the memory region to stable storage immediately, and remove write protection from the memory region.

* * * * *